United States Patent [19]
Jeong et al.

[11] Patent Number: 5,277,841
[45] Date of Patent: Jan. 11, 1994

[54] MIXED BLUE EMITTING PHOSPHOR

[75] Inventors: Jwa-young Jeong, Seoul; Won-ho Yun, Kyungki-do; Jun-bae Lee, Seoul; Chang-won Park, Kyungki-do, all of Rep. of Korea

[73] Assignee: Samsung Display Devices Co., Ltd., Kyungki-do, Rep. of Korea

[21] Appl. No.: 77,913

[22] Filed: Jun. 18, 1993

[30] Foreign Application Priority Data

Feb. 11, 1993 [KR] Rep. of Korea ............. 93-1846
Feb. 11, 1993 [KR] Rep. of Korea ............. 93-1847
Feb. 12, 1993 [KR] Rep. of Korea ............. 93-1912

[51] Int. Cl.$^5$ ............. C09K 11/56; C09K 11/79; C09K 11/80; C09K 11/86
[52] U.S. Cl. ............. 252/301.6 S; 252/301.4 R; 252/301.4 F; 252/301.4 H
[58] Field of Search ............. 252/301.6 S, 301.4 R, 301.4 F, 301.4 H; 313/467; 313/468

[56] References Cited

U.S. PATENT DOCUMENTS 4,152,483  5/1979  Kanda et al. ............ 252/301.6 S
4,681,807  7/1987  Schulze et al. ............ 252/301.6 S

FOREIGN PATENT DOCUMENTS 0408113   5/1990  European Pat. Off. .
4129445   3/1992  Fed. Rep. of Germany ... 252/301.6 S
52-30158  8/1977  Japan .
55-1003   1/1980  Japan .
55-56339  4/1980  Japan ............ 252/301.6 S
55-83132  6/1980  Japan ............ 252/301.6 S
59-215383 12/1984 Japan ............ 252/301.6 S
60-94491  5/1985  Japan ............ 252/301.6 S
2-135276  5/1990  Japan .
2-255791  10/1990 Japan .
3-45688   2/1991  Japan ............ 252/301.6 S Primary Examiner—Jack Cooper
Attorney, Agent, or Firm—Leydig, Voit & Mayer

[57] ABSTRACT

A mixed blue emitting phosphor is obtained by mixing ZnS:Ag,Al with at least one green emitting phosphor selected from the group consisting of $Y_3(Al,Ga)_5O_{12}$:Tb, $Y_2SiO_5$:Tb and LaOCl:Tb of an amount below 20 wt %, thereby greatly enhancing luminance and luminance-saturation characteristic.

13 Claims, 2 Drawing Sheets

MIXED BLUE EMITTING PHOSPHOR

BACKGROUND OF THE INVENTION

1. Field of the Invention

The present invention relates to a mixed blue emitting phosphor, for cathode ray tube and more particularly to a mixed blue emitting phosphor having improved luminance and luminance-saturation characteristics.

2. Description of the Related Art

Along with the achievement of enlargement and high definition of color cathode ray tubes, display tubes, projections tubes, etc., various studies are being carried out to enhance the luminance of a screen. Especially, as current density is heightened, the chromaticity coordinates of light emitted from phosphors shift and luminance variation occurs. Thus, concentration is on developing phosphors which have an excellent current-to-emission characteristic (hereinafter, referred to as the $\gamma$-characteristic) as well as very good temperature and durability characteristics. The phosphor which should particularly have an excellent $\gamma$-characteristic is the blue emitting phosphor. This is because, while the green and red emitting phosphors utilized in the projection tube which is driven under high current density and high voltage are composed of rare earth elements and thus have an inherently good $\gamma$-characteristic, the zinc sulfide (ZnS)-based phosphor used as the blue emitting phosphor has a poor $\gamma$-characteristic since it does not belong to the rare earth phosphors.

In view of this problem, different from the ZnS:Ag,Cl phosphor for the use as the blue emitting phosphor in a general cathode ray tube, a ZnS:Ag,Al phosphor having an improved $\gamma$-characteristic has been developed. However, there is room for further improvement of this phosphor, which thereby stipulates the need for a better phosphor.

Accordingly, in order to improve the characteristic of the ZnS:Ag,Al phosphor, research is being conducted on the control of phosphor characteristics, on the partial replacement of the host and/or activator with another element and on the use of mixed phosphors.

Japanese Patent No. sho 52-30158, and Japanese Patent Laid-open Publication No. sho 55-1003 describe that, when the ZnS:Ag,Cl and ZnS:Ag,Al phosphors have a cubic crystalline structure, they display excellent luminance characteristics.

European Patent Laid-open Publication No. EP 0 408 113 A1 discloses a technique wherein chromaticity coordinates are adjusted by adding cadmium (Cd) and selenium (Se) to ZnS:Ag phosphor to thereby enhance the emission characteristic. Japanese Patent Laid-open Publication No. hei 2-255791 improves the luminance-saturation characteristic by adding Cd and Se to ZnS:Ag,Al phosphor.

Also, Japanese Patent Laid-open Publication No. hei 2-135276 discloses a technique for improving the luminance under a high current density by mixing ZnS:Ag,Al phosphor with a secondary phosphor, e.g., $[(Sr,Ca,Eu)_3Mg]ZnSi_2O_8$, $Ca_3MgEu(PO_4)_2$ or $(ZnMEu)_2Al_4Si_5O_{18}$.

However, any luminance increase is slight when achieved by lengthening the wave of a single phosphor or mixing the phosphors. Thus, it has been determined that the effect of increasing the liminance attained by mixing the ZnS:Ag,Al phosphor (currently the best-known blue emitting phosphor for a projection tube) with another blue emitting phosphor, cannot satisfy the demand.

As described above, the ZnS-based phosphors is chiefly used as the blue emitting phosphor for a cathode ray tube. Although these phosphors have excellent luminance, they have poor durability and luminance saturation characteristics, and therefore are unfavorable for the use in projection tubes to be stimulated under high voltage and high current.

On the other hand, copper, gold-activated, aluminum-coactivated, zinc sulfide (ZnS:Cu,Au,Al), copper-activated, aluminum-coactivated zinc sulfide (ZnS:Cu,Al) phosphors are widely used as the green emitting phosphor for the cathode ray tube. However, since these ZnS-based phosphors have luminance-saturation, temperature and durability characteristics unsuitable for use in projection tubes, phosphors of rare earth elements, e.g., terbium-activated yttrium aluminum galate ($Y_3(Al,Ga)_5O_{12}$:Tb), terbium-activated yttrium silicate ($Y_2SiO_5$:Tb) and terbium-activated lanthanum oxychloride (LaOCl:Tb), have been developed to solve the above-mentioned problem, and are currently being used satisfactorily.

SUMMARY OF THE INVENTION

The present invention is contrived to solve the above-described problems of the conventional blue emitting phosphors. It is the object of the present invention to provide a mixed blue emitting phosphor obtained by mixing a blue emitting phosphor with a small quantity of green emitting phosphor of a rare earth element having excellent phosphor characteristics, in order to improve the emission luminance and enhance the $\gamma$-characteristic of the blue emitting phosphor used for a projection tube or display tube driven under high current density and high voltage.

To achieve the above object of the present invention, there is provided a mixed blue emitting phosphor comprising: at least one phosphor selected from the group consisting of terbium-activated yttrium aluminum gallate [$Y_3(Al,Ga)_5O_{12}$:Tb], terbium-activated yttrium silicate ($Y_2SiO_5$:Tb) and terbium activated lanthanum oxychloride (LaOCl:Tb) being of an amount below 20 wt % of the total amount of the mixed phosphor, and ZnS:Ag,Al of the remaining amount thereof.

Preferably, a blue pigment is attached onto a surface of the $Y_3(Al,Ga)_5O_{12}$:Tb, $Y_2SiO_5$:Tb and LaOCl:Tb phosphors.

As the amount of the green emitting phosphor mixed with the ZnS:Ag,Al phosphor is increased, the luminance characteristic and $\gamma$-characteristic thereof improve greatly, but hue is degraded, so that the green emitting phosphor should be mixed in consideration of its characteristics. In such a case, the effect can be obtained even though a small amount is mixed.

Due to this fact, the mixed blue emitting phosphor is preferably obtained by mixing the ZnS:Ag,Al phosphor with a $Y_3(Al,Ga)_5O_{12}$:Tb phosphor of below 15 wt %, and more preferably, by mixing it with one below 10 wt %, with reference to the total amount of the mixed phosphor.

Also, it is preferable to obtain the mixed blue emitting phosphor by mixing the ZnS:Ag,Al phosphor with a $Y_2SiO_5$:Tb phosphor of below 10 wt %, with reference to the total amount of the mixed phosphor.

Furthermore, the mixed blue emitting phosphor is preferably obtained by mixing the ZnS:Ag,Al phosphor with a LaOCl:Tb phosphor of below 15 wt %, and more preferably, by mixing it with one in the range of 2~10 wt %, with reference to the total amount of the mixed phosphor.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

A green emitting phosphor $Y_3(Al,Ga)_5O_{12}$:Tb which is a rare earth phosphor for a projection tube is characterized in that it has an excellent γ-characteristic, good visibility efficiency, and high emission luminance when compared with ZnS:Ag,Al phosphor. Green emitting phosphors $Y_2SiO_5$:Tb and LaOCl:Tb are also known as having excellent γ-characteristics. The γ-characteristics and chromaticity coordinates of these phosphors and the ZnS:Ag,Al phosphor shown in a phosphor handbook are illustrated in Table 1 below.

TABLE 1

| phosphor | γ value | chromaticity coordinates x | y |
| --- | --- | --- | --- |
| ZnS:Ag, Al | 0.75 | 0.1459 | 0.0578 |
| $Y_3(Al, Ga)_5O_{12}$:Tb | 0.97 | 0.3504 | 0.5489 |
| $Y_2SiO_5$:Tb | 0.98 | 0.3312 | 0.0584 |
| LaOCl:Tb | 0.82 | 0.3269 | 0.5786 |

Here, if the green phosphors $Y_3(Al,Ga)_5O_{12}$:Tb, $Y_2SiO_5$:Tb and LaOCl:Tb shown in Table 1 are mixed with blue emitting ZnS:Ag,Al phosphor as in the present invention, it may be assumed that the purity of the blue color is degraded.

However, it is known that the red and green emitting phosphors used in a cathode ray tube operating under high current density and high voltage do not display pure red or green but have emission peaks in areas other than those designating red and green.

Figure 1:
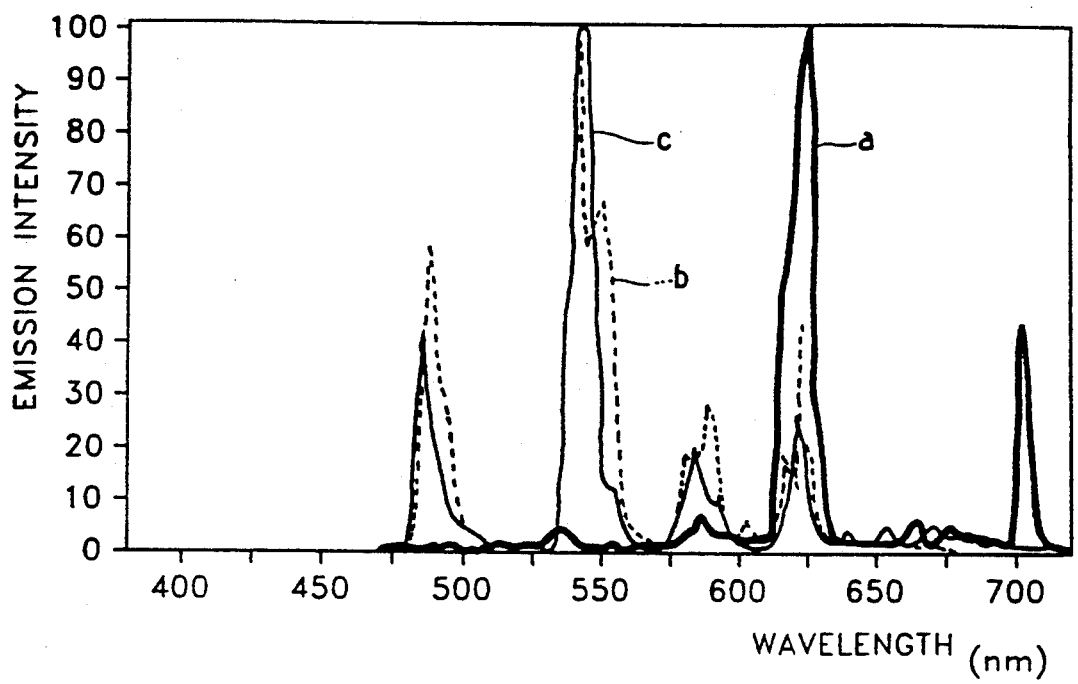
FIG. 1 is a graph representation plotting the emission spectra of a red emitting phosphor $Y_2O_3$:Eu (a) and green emitting phosphors LaOCl:Tb (b) and $Y_3(Al,Ga)_5O_{12}$:Tb (c)

FIG. 1 shows emission spectra of a representative red emitting phosphor $Y_2O_3$:Eu (a) and blue emitting phosphors LaOCl:Tb (b) and $Y_3(Al,Ga)_5O_{12}$:Tb (c). Here, it can be noted that the red emitting phosphor has the highest peak emission intensity around 615 nm, a relatively high peak around 700 nm, and slight peaks around 570 nm. Since the wavelengths beyond 615 nm are for red, the peak in this area creates no problem, but that in the area below 600 nm is an undesirable peak of the green area. Also, the green emitting phosphors LaOCl:Tb and $Y_3(Al,Ga)_5O_{12}$:Tb have peaks in the wavelengths below 500 nm of the blue emission area and in the wavelengths beyond 600 nm of the red emission area, besides the main peak (around 550 nm). That is, the variation of the color purity involved in the mixed blue emitting phosphor of the present invention may not be greatly deviated from a range of the color purity deviation of a common single phosphor.

However, the mixed amount of $Y_3(Al,Ga)_5O_{12}$:Tb, $Y_2SiO_5$:Tb and LaOCl:Tb phosphors should be too small to affect the chromaticity coordinates of blue.

Although the chromaticity coordinates of the mixed phosphor obtained by the present invention do not greatly depart from those of the blue, this invention solves the problem by coating the surface of the green emitting phosphor with blue pigments, utilizing a continuous study for solving the problem of degraded color purity.

Any common blue pigment may be used as the blue pigment, e.g., preferably, ultramarine ($3NaAl.SiO_2.Na_2S_2$), prussian blue ($Fe_4[Fe(CN_6]_3.nH_2O$), cobalt blue ($CoO.nAl_2O_3$), cerulean blue ($CoO.nSnO_2$) and cupric sulfide (CuS).

Hereinbelow, the effect obtained by the mixed blue emitting phosphors according to the present invention will be described in detail with reference to preferred embodiments.

Embodiment 1

Formation of ZnS:Ag,Al Phosphor

First, 300 g of ZnS (luminescent grade), 1.65 g of aluminum nitrate [$Al(NO_3)_3$], 1 g of sodium iodide (NaI), 0.2 g of ammonium iodide ($NH_4I$), 0.25 g of potassium iodide (KI) 2 g of sulfur (S) and 90 ml of silver nitrate ($AgNO_3$) solution having an Ag-ion concentration of 1000 ppm are mixed until a uniform consistency is reached. Then, the mixture is fired under a reducing atmosphere using carbon and nitrogen gas at 980° C. for 3 hours and 10 minutes. After the firing, the ZnS:Ag,Al phosphor is formed by washing, ball-milling and drying the fired mixture.

Formation of the $Y_3(Al,GA)_5O_{12}$:Tb Phosphor 100 g of yttrium oxide ($Y_2O_3$), 52.7 g of aluminum oxide ($Al_2O_3$), 41.5 g of gadolinium oxide ($Gd_2O_3$), 10 g of terbium oxide ($Tb_4O_7$) and 7 g of barium fluoride ($BaF_2$) are homogeneously mixed. Thereafter, the obtained mixture is fired at a temperature of 1,500° C. for 2 hours. After firing, the $Y_3(Al,Ga)_5O_{12}$:Tb phosphor is formed by washing, ball-milling and drying the fired mixture.

The single ZnS:Ag,Al phosphor is set as a sample #1-1, mixed blue emitting phosphor (sample #1-2) obtained by mixing 95 wt % of ZnS:Ag,Al phosphor with 5 wt % of $Y_3(Al,Ga)_5O_{12}$:Tb phosphor and another mixed blue emitting phosphor (sample #1-3) obtained by mixing 90 wt % of ZnS:Ag,Al phosphor with 10 wt % of of $Y_3(Al,Ga)_5O_{12}$:Tb phosphor are prepared. Respective luminosites, chromaticity coordinates and particle diameters are compared in the following Table 2.

TABLE 2

| sample | luminance (%) | chromaticity coordinates | | particle diameter ($\mu m$) |
|---|---|---|---|---|
| | | x | y | |
| #1-1 | 100 | 0.1457 | 0.0626 | 11.06 |
| #1-2 | 112.7 | 0.1491 | 0.0678 | 11.80 |
| #1-3 | 117.1 | 0.1528 | 0.0744 | 11.76 |

Here, the diameter of the phosphor is a median value measured by an ELZON 180XY, and the luminance is a value measured at a current of 350 $\mu A$ and a voltage of 30 kV. Also, the luminance and chromaticity coordinates are measured by means of a cathodoluminescence system.

Figure 2:
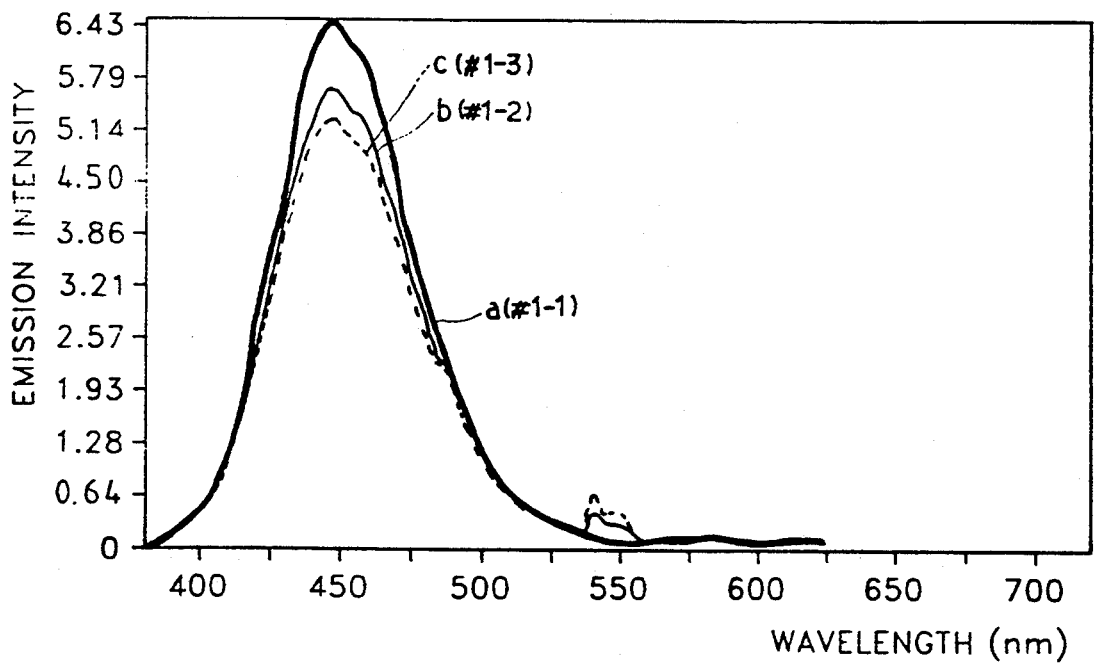
FIG. 2 is a graphic representation plotting the emission spectra of a conventional phosphor and mixed phosphors obtained according to one embodiment of the present invention, where "a" is of the conventional single ZnS:Ag,Al phosphor (sample #1-1), while "b" (sample #1-2) and "c" (sample #1-3) are of the mixed phosphors obtained by mixing Zns:Ag,Al with the $Y_3(Al,Ga)_5O_{12}$:Tb of the present invention.

FIG. 2 represents the emission spectra of the ZnS:Ag,Al phosphor and the mixed phosphors formed according to the above embodiment of the present invention. Here, "a" is of the conventional single ZnS:Ag,Al phosphor (sample #1-1), while "b" (sample #1-2) and "c" (sample #1-3) are of the mixed phosphors obtained by mixing ZnS:Ag,Al with $Y_3(Al,Ga)_5O_{12}$:Tb of the present invention.

From the spectrum graphs, it can be noted that the mixed phosphors "b" and "c" of the present invention have main peaks in the blue area around 450 nm (even if they are lower than that of the ZnS:Ag,Al phosphor). The peak near 550 nm is caused by the mixed $Y_3(Al,Ga)_5O_{12}$:Tb phosphor, which emits green. As described above, although the mixed phosphors according to the present invention have undesirable green peaks, these peaks are insignificant when compared with the main peak, which thus is negligible as can be understood in the chromaticity coordinate values.

Embodiment 2

Formation of ZnS:Ag,Al Phosphor

The phosphor materials used in the first embodiment are consistently mixed in the same amount as in the first embodiment. Then, this mixture is fired at 950° C. for 3.5 hours under a reducing atmosphere. After the firing, the ZnS:Ag,Al phosphor is prepared by washing, ball-milling and drying the fired mixture.

Here, the $Y_3(Al,Ga)_5O_{12}$:Tb phosphor used in the first embodiment is utilized.

By mixing 95 wt % of ZnS:Ag,Al phosphor with 5 wt % of $Y_3(Al,Ga)_5O_{12}$:Tb phosphor, the mixed blue emitting phosphor (sample #2-2) of the present invention is formed. The luminance, chromaticity coordinates and particle diameter thereof are written in table 3, while being compared with those of a single ZnS:Ag,Al phosphor (sample #2-1), and ZnS:Ag,Cl.

TABLE 3

| sample | luminance (%) | chromaticity coordinates | | particle diameter ($\mu m$) |
|---|---|---|---|---|
| | | x | y | |
| ZnS:Ag, Cl | 100 | 0.1445 | 0.0672 | 9.00 |
| #2-1 | 98 | 0.1497 | 0.0686 | 10.38 |
| #2-2 | 101.6 | 0.1489 | 0.0674 | 11.11 |

Using the samples #2-1 and #2-2 of Table 3, a 7-inch projection tube is manufactured by a common sedimentation method. The characteristics of the phosphor screen of the obtained projection tube are shown in the following Table 4.

TABLE 4

| sample | luminance (%) | chromaticity coordinates | | $\gamma$ value |
|---|---|---|---|---|
| | | x | y | |
| #2-1 | 100 | 0.1442 | 0.0643 | 11.06 (100%) |
| #2-2 | 120.8 | 0.1487 | 0.0749 | 11.76 (115.2%) |

As shown in Tables 2 to 4, as well as the characteristic of the particles of the mixed phosphors according to the present invention obtained by mixing ZnS:Ag,Al with $Y_3(Al,Ga)_5O_{12}$:Tb, the luminance (improved by 20.8%) and $\gamma$-characteristic (improved by 15.2%) of the phosphor screen which adopts the mixed phosphors are remarkably improved.

Embodiment 3

Formation of ZnS:Ag,Al Phosphor

First, 100 g of ZnS, 0.55 g of $Al(NO_3)_3$, 0.33 g of NaI, 0.067 g of $NH_4I$, 0.083 g of KI, 0.67 g of S and 120 ml of $AgNO_3$ solution having an Ag-ion concentration of 250 ppm are mixed until a uniform consistency is reached. Then, the mixture is fired under a reducing atmosphere at 950° C. for 3.5 hours. After the firing, the ZnS:Ag,Al phosphor is formed by washing, ball-milling and drying the fired mixture.

Formation of the $Y_2SiO_5$:Tb Phosphor 200 g of $Y_2O_3$, 24 g of $SiO_2$, 20 g of $Tb_4O_7$, 14 g of $BaF_2$ are consistently mixed. Thereafter, the obtained mixture is fired at a temperature of about 1,200°~1,400° C. for 1~3 hours under a weak reducing atmosphere. After firing, the $Y_2SiO_5$:Tb phosphor is formed by washing, and drying the fired mixture.

100 g of the $Y_2SiO_5$:Tb phosphor obtained as above is dispersed in 0.3% of gelatin solution having 1.0 g of gelatin to thereby form phosphor dispersion. Separately, 2 g of cobalt blue pigment is dispersed in 0.3 % of gum arabic solution having 0.7 g of gum arabic, thereby obtaining a pigment-dispersed solution. The above two solutions are mixed with each other and agitated until of a uniform consistency. Then, the pH of the mixture is adjusted to be 4.2, and the mixture is cooled to a temperature below 10° C. Thereafter, 1 g of formalin is dropped into the obtained coolant. The mixture is left intact, and then the supernatant is poured out. After thrice washing the sediment using distilled water, the resultant product is dried and separated to thereby form $Y_2SiO_5$:Tb phosphor to which the cobalt blue pigment is coated.

The luminosities and chromaticity coordinates of the single ZnS:Ag,Al phosphor (sample #3-1), the phosphor (sample #3-2) obtained by mixing 95 wt % of ZnS:Ag,Al with 5 wt % of $Y_2SiO_5$:Tb phosphor, the phosphor (sample #3-3) obtained by mixing 90 wt % of ZnS:Ag,Al with 10 wt % of $Y_2SiO_5$:Tb, and the phosphor (sample #3-4) obtained by mixing 95 wt % of ZnS:Ag,Al with 5 wt % of $Y_2SiO_5$:Tb which has no pigment, are shown in Table 5.

TABLE 5

| sample | luminance (%) | chromaticity coordinates | |
|---|---|---|---|
| | | x | y |
| #3-1 | 100 | 0.1459 | 0.0578 |
| #3-2 | 121.0 | 0.1467 | 0.0597 |
| #3-3 | 137.2 | 0.1496 | 0.0674 |
| #3-4 | 125.4 | 0.1496 | 0.0658 |

In the foregoing Table 5, it can be noted that the mixed phosphors according to the present invention have the characteristics of a greatly enhanced luminance and the chromaticity coordinates nearer to blue, as compared with the conventional single ZnS:Ag,Al phosphor. Also, the mixture (sample #3-2) of the Y$_2$SiO$_5$:Tb to which the blue pigment is attached has better hue than those of the mixture of Y$_2$SiO$_5$:Tb (sample #3-3) without the blue pigment and the mixture (sample #3-3) obtained by mixing a great amount of the Y$_2$SiO$_5$:Tb evenly coated with the blue pigment.

A phosphor screen is manufactured using the sample #3-2 whose luminance and hue are both excellent. The phosphor screen is manufactured via a sedimentation method, the luminance and γ- characteristic with respect to the obtained phosphor screen are shown in the following table 6, which are measured by means of a demountable system.

TABLE 6

| sample | luminance (%) | γ value | chromaticity coordinates x | y |
|---|---|---|---|---|
| #3-1 | 100 | 0.728 (100%) | 0.1415 | 0.0573 |
| #3-2 | 120.5 | 0.770 (105.8%) | 0.1448 | 0.0592 |

Here, the luminosities are measured at a voltage of 25 kV and a current value of 550 μA, in which the luminance value of sample #3-1 is 1.17 and that of sample #3-2 is 1.41. Also, after measuring the emission luminance while gradually increasing a current value from 200 μA to 1,200 μA at a voltage of 25 kV, the γ-characteristic is calculated according to the following equation (1):

$$\gamma = \frac{Y_2}{6Y_1} \qquad (1)$$

wherein $Y_1$ is the luminance at 200 μA and $Y_2$ is the luminance at 1,200 μA.

From Table 6, it can be noted that the luminance of the sample obtained by mixing the ZnS:Ag,Al phosphor with a small amount of the Y$_2$SiO$_5$:Tb coated with the blue pigment is improved by approximately 20% in both the particle state and the phosphor screen state, when compared with the single ZnS:Ag,Al phosphor. Moreover, the γ-characteristic is improved by approximately 5~6%, which indicates that the phosphor according to the present invention displays a better phosphor characteristic under the high current density than does the single ZnS:Ag,Al phosphor.

Furthermore, the problem of the degraded color purity due to mixing of the Y$_2$SiO$_5$:Tb phosphor can be fully solved by attaching the blue pigment onto the surface of the green phosphor.

Figure 3:
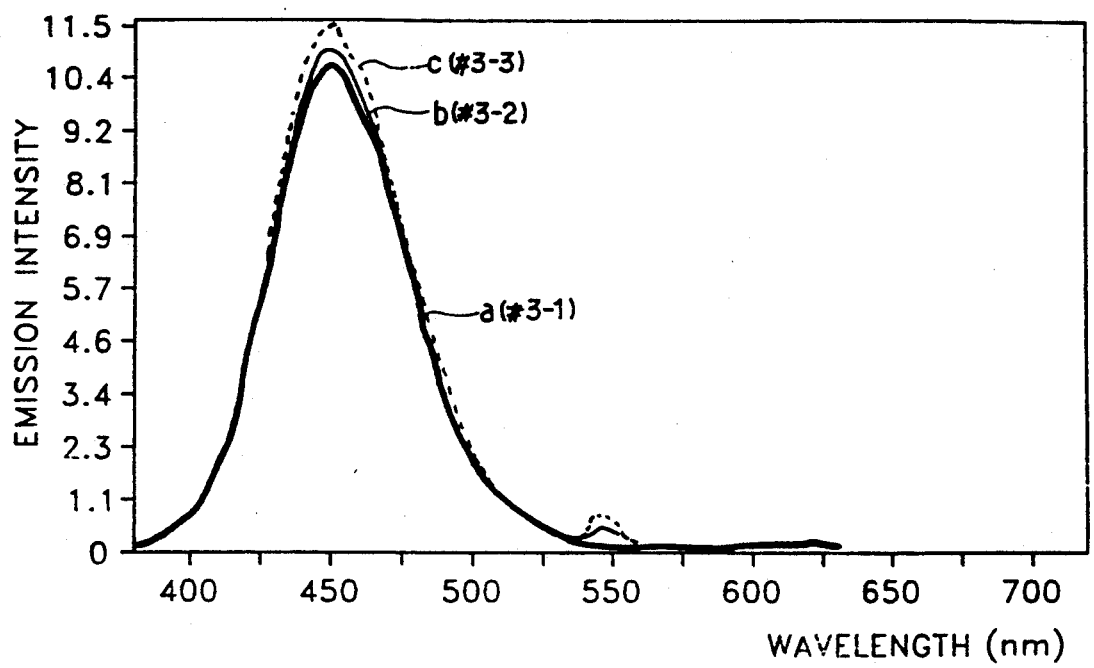
FIG. 3 is a graphic representation plotting the emission spectra of a conventional phosphor and mixed phosphors obtained according to another embodiment of the present invention, wherein "a" is of the conventional single ZnS:Ag,Al phosphor (sample #3-1), while "b" (sample #3-2) and "c" (sample #3-3) are of the mixed phosphors obtained by mixing ZnS:Ag,Al with the $Y_2SiO_5$:Tb of the present invention.

FIG. 3 is a graphic representation plotting the emission spectra of the conventional phosphor and the mixed phosphors obtained according to the above embodiment of the present invention, wherein "a" is of the conventional single ZnS:Ag,Al phosphor (sample #3-1), while "b" (sample #3-2) and "c" (sample #3-3) are of the mixed phosphors obtained by mixing ZnS:Ag,Al with Y$_2$SiO$_5$:Tb of the present invention.

In case of the mixed phosphor according to the present invention, although the green emission peak owing to the Y$_2$SiO$_5$:Tb phosphor occurs in the 550 nm wavelength area, this is slight when compared to the overall spectral region, which therefore has no problem in the color purity characteristic of the phosphor itself.

Embodiment 4

Formation of ZnS:Ag,Al phosphor 300 g of ZnS (luminescent grade), 1.65 g of Al(NO$_3$)$_3$, 1 of NaI, 0.2 g of NH$_4$I, 0.25 g of KI, 2 g of S, and 90 ml of AgNO$_3$ solution having an Ag-ion concentration of 1,000 ppm are mixed so as to be of a uniform consistency. Then, the obtained mixture is fired at a temperature of 990° C. for 2 hours under a reducing atmosphere using carbon and nitrogen gas. After the firing, washing, ball-milling and drying are carried out to thereby form the ZnS:Ag,Al blue emitting phosphor.

Formation of LaOCl:Tb phosphor

First, 100 g of La$_2$O$_3$ and 15 g of Tb$_4$O$_7$ are dissolved in a proper amount of nitric acid to be consistently mixed with each other. Then, oxalic acid coprecipitate of lanthanum (La) and terbium (Tb) is formed, using 70 g of oxalic acid. After drying, the mixture is dry-mixed with 50 g of NH$_4$Cl and then fired at a temperature of 1,100° C. for 2.5 hours under a reducing atmosphere, in a furnace. Thereafter, the mixture is washed and dried to thereby form the LaOCl:Tb phosphor.

The mixed phosphor according to the present invention is formed by mixing the obtained ZnS:Ag,Al with LaOCl:Tb phosphors in such a manner that the mixed amount of the LaOCl:Tb phosphor is respectively 5 wt % (sample #4-2), 10 wt % (sample #4-3) and 15 wt % (sample #4-4) with respect to the total amount of the mixed phosphor. The ZnS:Ag,Al single phosphor is represented by sample #4-1. The characteristics of each phosphor are compared in Table 7.

TABLE 7

| sample | chromaticity coordinates x | y | luminance (%) | γ value |
|---|---|---|---|---|
| #4-1 | 0.1445 | 0.0592 | 100 | 0.725 |
| #4-2 | 0.1498 | 0.0696 | 116.3 | 0.760 |
| #4-3 | 0.1538 | 0.0829 | 125.0 | 0.769 |
| #4-4 | 0.1596 | 0.0967 | 149.5 | 0.785 |

Here, the chromaticity coordinates and comparative luminance are measured by means of a cathodoluminescence system. Also, the γ-characteristic is calculated according to the following equation (1) after measuring the luminance while varying current value from 60 to 120 μA at a driving voltage of 20 kV, using a PTE system. At this time, with the raster size set to 3 cm×3 cm, $Y_1$ is the luminance at 60 μA and $Y_2$ is the luminance at 120 μA.

$$\gamma = \frac{Y_2}{6Y_1} \qquad (1)$$

With reference to the foregoing Table 7, the characteristic of the mixed phosphor according to the present invention is compared with that of the conventional single ZnS:Ag,Al phosphor (sample #4-1), taking sample #4-2 (obtained by mixing 5 wt % of LaOCl:Tb phosphor) as an example. Here, in the chromaticity coordinates, the x-coordinate is increased by as much as 0.0043, and the y-coordinate is increased by about 0.01, which denotes chromaticity coordinates slightly varied toward the green emission area. While there is no great loss in color purity, the luminance is improved by 16.3%, and the γ-characteristic is greatly increased from 0.725 to 0.760.

Figure 4:
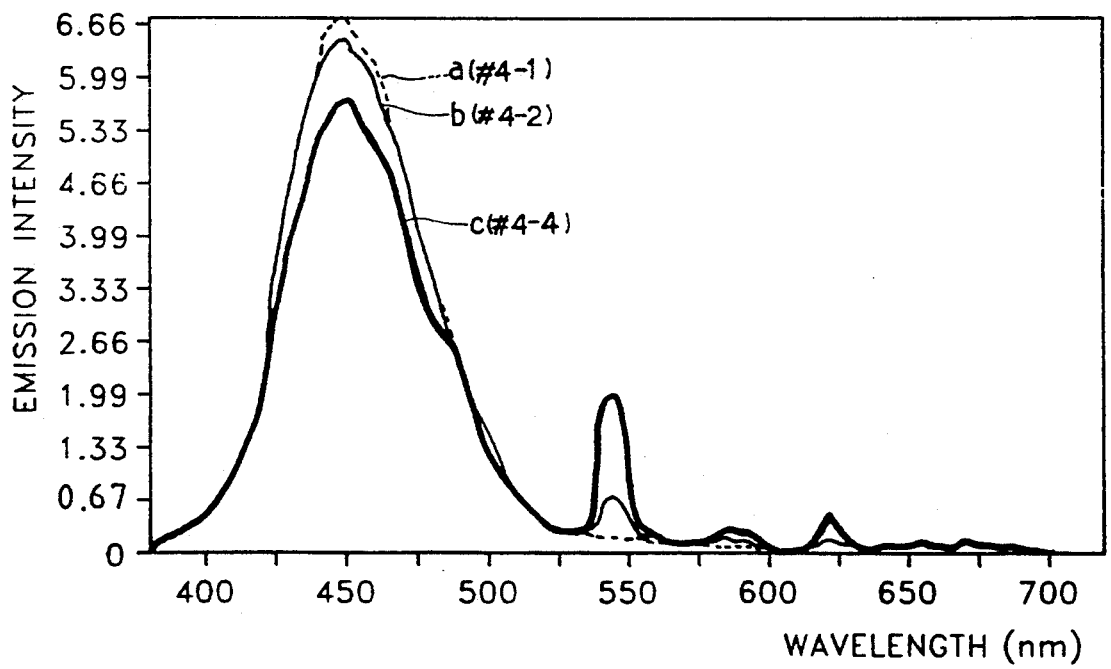
FIG. 4 is a graphic representation plotting the emission spectra of a conventional phosphor and mixed phosphors obtained according to a further embodiment of the present invention, wherein "a" is of the conventional single ZnS:Ag,Al phosphor (sample #4-1), while "b" (sample #4-2) and "c" (sample #4-4) are of the mixed phosphors obtained by mixing ZnS:Ag,Al with the $Y_3(Al,Ga)_5O_{12}$:Tb of the present invention.

FIG. 4 is a graph representation plotting the emission spectra of a conventional phosphor and mixed phosphors obtained according to a further embodiment of the present invention, wherein "a" is of the conventional single ZnS:Ag,Al phosphor (sample #4-1), and "b" (sample #4-2) and "c" (sample #4-4) are of the mixed phosphors obtained by mixing Zns:Ag,Al with LaOCl:Tb of the present invention. Here, it can be realized that, different from the conventional phosphor, the graphs "b" and "c" showing the mixed phosphors according to the present invention have small peaks around 550 nm which is the green emission area. Particularly, as the mixed amount of the LaOCl:Tb phosphor is increased, the green peak around the 550 nm area is increased. However, as described with reference to FIG. 1, such an extra peak is not a serious problem.

This inventor analyzed the luminance characteristic of the mixed blue emitting phosphor obtained by mixing the ZnS:Ag,Al phosphor with LaPO$_4$:Ce phosphor which is a green emitting phosphor for the use in a lamp, wherein it can be observed that the luminance and γ-characteristic are not increased. This is considered as the LaPO$_4$:Ce phosphor for a lamp has a good photoluminescence efficiency while has a low cathodoluminescence efficiency. The luminosities, chromaticity coordinates and γ-values with respect to the mixture of 5 wt % of LaPO$_4$ and 95 wt % of ZnS:Ag,Al are illustrated in Table 8.

TABLE 8

|  | luminance (%) | chromaticity coordinates | | γ value |
|---|---|---|---|---|
|  |  | x | y |  |
| ZnS:Ag, Al | 100 | 0.1445 | 0.0658 | 0.533 |
| ZnS:Ag, Al + LaPO$_4$:Ce | 97.9 | 0.1448 | 0.0661 | 0.530 |

Additionally, in order to solve for the deterioration of the color purity in the mixed phosphors according to the present invention due to the peaks in the green area (which do not appear in the conventional single phosphor) as shown in FIGS. 2, 3 and 4, this inventor carried out an experiment wherein blue pigment is attached onto the surface of each green emitting phosphor and then studied the result. The luminosities, chromaticity coordinates and γ values of the phosphors with and without the blue pigment according to the present invention are compared in Table 9 below.

In the mixed phosphor, the mixed amount of the phosphors is such that the ZnS:Ag,Al phosphor is 95 wt % and the green phosphor is 5 wt %, and the ultramarine is sued as the pigment. Respective phosphors with the pigments are manufactured by the same method as of the pigment-coated Y$_2$SiO$_5$:Tb phosphor described in the third embodiment.

TABLE 9

|  | sample |  | lum (%) | chromaticity coordinates | | γ value |
|---|---|---|---|---|---|---|
|  |  |  |  | x | y |  |
| sp | ZnS:Ag, Al |  | 100 | 0.1442 | 0.0643 | 100 |
| mixed phosphor | Y$_3$(Al, Ga)$_5$O$_{12}$.Tb | x | 120.8 | 0.1487 | 0.0749 | 115 |
|  |  | ○ | 117.2 | 0.1460 | 0.0669 | 112 |
|  | Y$_2$SiO$_5$:Tb | x | 116.3 | 0.1498 | 0.0696 | 115.2 |
|  |  | ○ | 115.0 | 0.1472 | 0.0658 | 100.4 |
|  | LaOCl:Tb | x | 124.2 | 0.1496 | 0.0674 | 107.8 |
|  |  | ○ | 121.0 | 0.1467 | 0.0663 | 106.2 |

Here, sp designates the single phosphor, lum is the luminance, × is the state wherein the pigment is not attached, and ○ is the state wherein the pigment is attached thereto.

According to the present invention, the deterioration of the color purity can be prevented by attaching the blue pigment onto the surface of the green emitting phosphor which is used by being mixed with ZnS:Ag,Al phosphor.

In the present invention as described above, a small amount of Y$_3$(Al,Ga)$_5$O$_{12}$:Tb, Y$_2$SiO$_5$:Tb or LaOCl:Tb green phosphor having an excellent luminance characteristic is mixed with ZnS:Ag,Al blue emitting phosphor, so that a mixed blue emitting phosphor having a greatly improved luminance characteristic is obtained. Therefore, although the mixed phosphor of the present invention has a slight variation of the chromaticity coordinates from blue, it exhibits significantly increased luminance and an improved γ-characteristic which can sufficiently counteract the variation. Furthermore, the problem of deviating chromaticity coordinates is solved by attaching blue pigment onto the surface of the green phosphor.

The phosphor according to the present invention has an improved luminance and γ-characteristic, especially with respect to their initial condition, whereby a cathode ray tube displaying an excellent phosphor screen characteristic can be manufactured by adopting the phosphor of the present invention.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A mixed blue emitting phosphor comprising: at least one green emitting phosphor selected from the group consisting of terbium-activated yttrium aluminum gallate [Y$_3$(Al,Ga)$_5$O$_{12}$:Tb], terbium-activated yttrium silicate (Y$_2$SiO$_5$:Tb) and terbium-activated lanthanum oxychloride (LaOCl:Tb) present in an amount below 20 wt % of the total amount of said mixed phosphor, and ZnS:Ag,Al being the remaining amount thereof.

2. A mixed blue emitting phosphor as claimed in claim 1, wherein a blue pigment is attached to said Y$_3$(Al,Ga)$_5$O$_{12}$:Tb, Y$_2$SiO$_5$:Tb and LaOCl:Tb phosphors.

3. A mixed blue emitting phosphor as claimed in claim 2, wherein said blue pigment is at least one selected from the group consisting of ultramarine, prussian blue, cobalt blue, cerulean blue and cupric sulfide.

4. A mixed blue emitting phosphor as claimed in claim 1, wherein Y$_3$(Al,Ga)$_5$O$_{12}$:Tb is the green emitting phosphor and is present in an amount below 15 wt % of the total amount of said mixed phosphor.

5. A mixed blue emitting phosphor as claimed in claim 4, wherein a blue pigment is attached to said Y$_3$(Al,Ga)$_5$O$_{12}$:Tb phosphor.

6. A mixed blue emitting phosphor as claimed in claim 4, wherein the Y$_3$(Al,Ga)$_5$O$_{12}$:Tb phosphor is present in an amount below 10 wt % of the total amount of said mixed phosphor.

7. A mixed blue emitting phosphor as claimed in claim 1, wherein Y$_2$SiO$_5$:Tb is the green emitting phosphor and is present in an amount below 10 wt % of the total amount of said mixed phosphor.

8. A mixed blue emitting phosphor as claimed in claim 7, wherein a blue pigment is attached to said $Y_2SiO_5$:Tb phosphor.

9. A mixed blue emitting phosphor as claimed in claim 1, wherein LaOCl:Tb is the green emitting phosphor and is present in an amount below 15 wt % of the total amount of said mixed phosphor.

10. A mixed blue emitting phosphor as claimed in claim 9, wherein a blue pigment is attached to said LaOCl:Tb phosphor.

11. A mixed blue emitting phosphor as claimed in claim 9, wherein the LaOCl:Tb phosphor is present in an amount from 2 to 10 wt % of the total amount of said mixed phosphor.

12. A mixed blue emitting phosphor as claimed in claim 2 wherein said blue pigment is ultramarine.

13. A mixed blue emitting phosphor as claimed in claim 2 wherein said blue pigment is cobalt blue.

* * * * *